Feb. 14, 1956     B. A. WHITNEY     2,734,327
LAWN MOWER
Filed Aug. 23, 1954
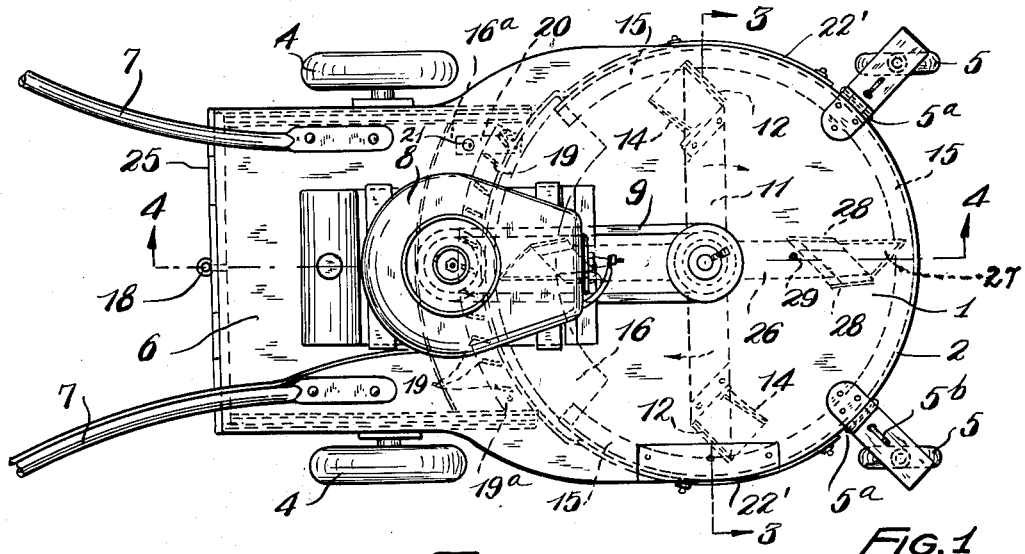
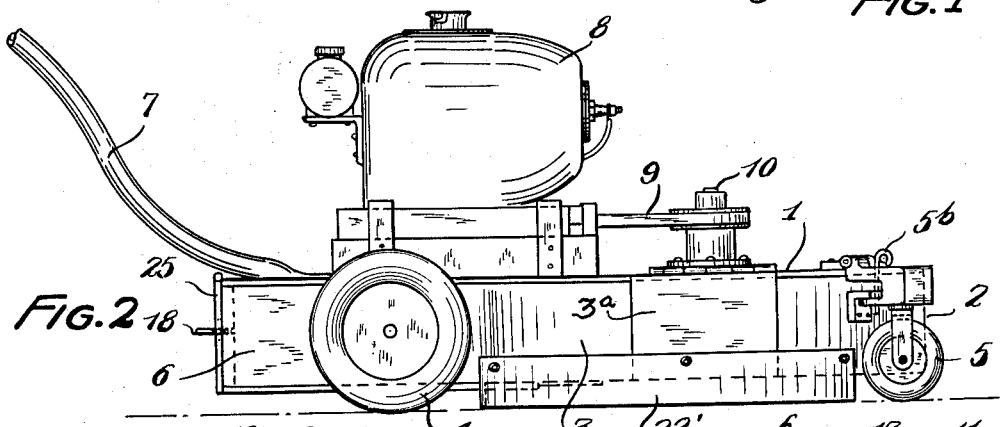
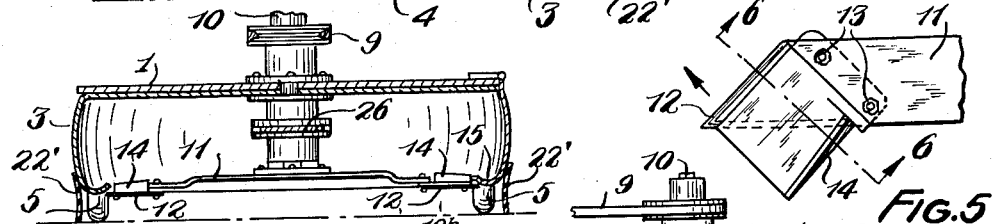
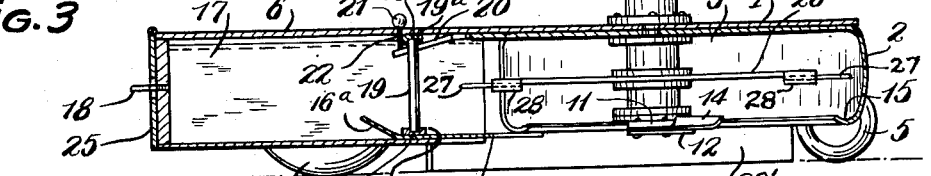
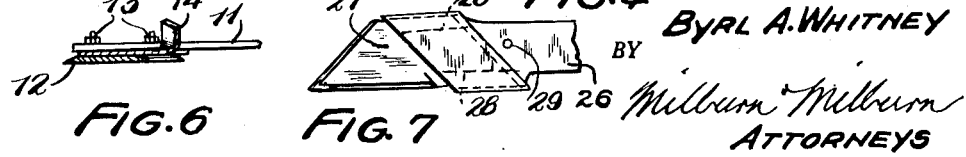
INVENTOR.
BYRL A. WHITNEY
BY
Milburn & Milburn
ATTORNEYS United States Patent Office 2,734,327
Patented Feb. 14, 1956

2,734,327

LAWN MOWER

Byrl A. Whitney, Lakewood, Ohio

Application August 23, 1954, Serial No. 451,615

15 Claims. (Cl. 56—25.4)

This invention relates to the general art of lawn mowers and cleaners.

I am of course familiar with the reel type of lawn mower, in which the blades are rotatable about a horizontal axis, and also the rotor type in which the blades are rotatable about a vertical axis. I am further aware that in both cases there have been included means for collecting the cut grass instead of depositing it upon the lawn as it is cut.

My present invention relates to the rotor type of lawn mower and comprises several improved features which will be later described herein.

One object of this invention is to devise a rotor type of lawn mower with an improved means for performing the cutting operation and a most efficient means for transferring the cut grass and other forms of litter to a container therefor.

A more specific object is to devise such a mower with a race-way into which the cut grass, leaves, etc. may be deposited and about which such litter may be conveyed so as to be delivered to a container therefor.

Another object of my present invention is to design the interior of the body of the mower in such manner as to promote the transmission and discharge of the cut grass, leaves, etc. without clogging therein.

Another object is to provide such a mower with a means for further ensuring comminution of the cut grass, leaves, etc. as they are delivered into the container therefor.

Another object is to provide a device that is capable of mowing and cleaning a lawn and collecting and further pulverizing the cut grass, leaves and other litter, all in one operation and without requiring any change-over of the working parts.

Another object is to devise such a rotor type of mower in which the cutting blades are so positioned as to obtain the most efficient cutting and cleaning operation.

Another object is to devise a rotor type of mower with stationary comminuting blades so arranged at the rear thereof as to also entrap the cut grass, leaves, etc. and thus prevent return of the same forwardly of the machine.

Another object is to provide such a mower with a readily removable cutting blade and means permitting ready replacement or renewal of the same and thereby precluding the necessity of costly lawn mower sharpening.

Another object is to provide such a mower in which each of the front wheels thereof is readily displaceable so as to permit closer approach of the mower to the desired area for the purpose of trimming.

Another object is to devise a lawn mower with a container for receiving the cut grass, leaves, etc., together with means associated therewith for indicating when it has become filled to a predetermined point.

Another object is to devise such a mower with an adjustable deflector plate at the rear thereof for preventing deposit of the cut grass, leaves, etc. against the legs of the operator when the container is not in use.

Another object is to devise a rotor type of mower with efficient means for attaching a guard means about approximately two-thirds of the bottom edge thereof so as to prevent discharge out past the sides and rear of the machine and to thereby permit it to be employed for removing different kinds of litter from the side-walk.

Other objects will appear from the following description and claims when considered together with the accompanying drawing.

Fig. 1 is a top plan view of my improved device;
Fig. 2 is a side elevation thereof;
Fig. 3 is a view taken on line 3—3 of Fig. 1;
Fig. 4 is a view taken on line 4—4 of Fig. 1;
Fig. 5 is an enlarged partial view illustrating my combination of cutting blade and deflector vane;
Fig. 6 is a view taken on line 6—6 of Fig. 5; and
Fig. 7 illustrates a modified means for mounting the blade tips upon their rotating arms.

Referring now to the accompanying drawing in detail, the body or housing has a top 1 and curved front end portion 2 and side portions 3, the body being open at the bottom and rear thereof except when the container is in place at the rear, as will appear from the following. The body is mounted upon the rear wheels 4 and the front castors or wheels 5 which are so spaced as to be laterally beyond the path of the cutting blades. The body has a rear extension 6 between the rear wheels 4 and has the handle 7 of the familiar bail type attached thereto for pushing and directing the mower. Upon the top there is mounted the internal combustion engine 8 which has belt drive connection 9 with the pulley on the vertically disposed shaft 10. Upon the lower end of the shaft 10 there is mounted the diametrically disposed arm 11 with a cutting blade tip 12 affixed to each end thereof.

The blade tip in each instance may be removably bolted to the end of the arm 11 and the same bolts 13 may be employed for attachment of the deflector vane 14 and its blade tip associated therewith in each instance. Each blade tip is set with its cutting edge at approximately 45 degrees to the longitudinal axis of the arm 11; and the vane 14 extends approximately parallel to the cutting edge of the blade tip 12. The rear edge portion of the vane 14 is curved upwardly and inwardly towards the cutting edge and is flared outwardly and rearwardly towards its radially outward end so as to deflect the cut grass, leaves, etc. as they are cut by the blade 12, upwardly, outwardly and circumferentially about the front and side wall portions of the body of the device. The lower edge of the front and side portions of the body or housing is curved inwardly and upwardly so as to provide a race-way 15 to receive the cut grass etc. as it is forced upwardly and circumferentially by the deflector vanes 14. The race-way 15 extends about only the front and side portions of the body and is open at its rear ends for the discharge of the cut grass, leaves, etc. therefrom at the rear.

The plane of the blades 12 is below the bottom edge of the race-way 15; and there is provided a platform 16 at the rear of the body for receiving the cut grass, leaves, etc. from the discharge end of the race-way 15. The blades 12 are located in a plane between those of the race-way 15 and the platform 16. The platform 16 overlaps the path of the cutting blades so that there will be a further chopping of the cut grass, leaves, etc. at this point before being discharged therebeyond. The platform 16 serves as a receiving area for any material from the cutting blade that was not thrown up and into the race-way, such material being ejected into the container 17 by the combined action of the rotating blades and deflector vanes. The rear part of the platform 16 may be inclined upwardly and rearwardly at an angle of about 30 degrees so as to allow clearance for the container therebeneath, such inclination being indicated by reference numeral 16a. Such inclination serves also as a means of trapping the material in the container and preventing the suction of the rotating blades and deflector vanes from withdrawing such material from the container. The container 17 is located at the rear of the platform 16 and may have slide engagement within the body of the device. The container 17 may have a handle 18 and any suitable form of means may be employed for holding the container in such position so as to be readily removable rearwardly from the body so as to empty the same at intervals as may be required. The container may be provided with screened openings in the upper rear part thereof so as to permit escape of the air therefrom as the cut grass, leaves, etc., are packed within the same.

For the purpose of greater efficiency in pulverizing the cut grass, leaves, etc., an auxiliary rotary arm 26 with cutter blade tips 27 may be provided at a higher level upon the upright shaft 10 and at an angle of ninety degrees to the lower arm 11. This upper blade means may be located in a plane above the race-way 15 and is adapted to still further pulverize the material as it comes from the deflector vanes 14. For instance, with both of these blade assemblies operating at approximately 2,000 revolutions per minute, the material will be finely pulverized without the necessity of any grill for this purpose, thereby precluding any clogging which would otherwise occur in the case of wet or green condition of the material.

As an alternative means for mounting the blade-tips, as illustrated in the upper assembly, the edge portions at each end of the arm may be turned downwardly and inwardly and outwardly towards each other so as to form a socket means 28 to receive the rear side edges of the blade tips which are of triangular form. During operation the blade tips 27 will be moved radially outwardly by centrifugal force so as to occupy effective position within the socket means 28; and the set screw 29 in the arm and at the rear of each of the blade tips will prevent the same from accidentally being removed from assembly during periods of idleness. At the same time, this arrangement permits ready removal of the blade tips for renewal; and also there is eliminated the necessity of bolts and protruding bolt heads beneath the cutting tips. Furthermore, with this arrangement there is no danger of the blade tips becoming loose during operation.

At the front open end of the container 17 I have provided the vertically disposed hack saw blades 19 that have their cutting edges facing into the path of the cut grass, etc. as it is discharged from the rear open end of the race-way 15 and platform 16 so as to effect a still further comminution of the same as it is forced thereagainst and therepast. The blades 19 are set at an angle for the purpose just explained and also for the purpose of entrapping the grass, leaves, etc., these blades being properly spaced from each other so as to prevent the escape of such material forwardly. The hack saw blades may be set in slots 19b in the upper and lower front edge portions of the container 17 and may be held in assembly by means of a strip 19a across each of the upper and lower ends of the blades. Since these slots open forwardly, the force of the action just explained will tend to hold the blades in place.

At the rear end of the interior of the body and on the body top there is hingedly mounted an arm 20 which will normally swing downwardly by gravity to a limited extent as determined by engagement of its visual indicator ball 21 on the upwardly extending projection 22 and which will be forced upwardly by the accumulation of the cut grass, etc. within the container when it has become filled to a predetermined degree. Thus the operator may be advised, by observing this indicator, when the container should be emptied. It is to be understood that, in locating this indicator, the direction of rotation of the cutter means should be taken into account in order to have it located in that part of the machine so as to prevent the container to become filled before the indicator is actuated.

By having each of the castors or wheels 5 hingedly mounted, as at 5a, either of them may be swung upwardly out of the way so as to permit closer approach of the mower to the area which is to be covered by the mower, as for instance for the purpose of trimming the edge of the lawn. Any suitable means may be provided for holding the castors or wheels in lowered position, as indicated for instance by reference numeral 5b.

Since most of the cutting action is performed by the forward tip of the cutting blade, I have found that it is desirable to give the cutting blade a slight downward and forward tilt in order to avoid back-drag, particularly drag of the heads of the bolts that hold the cutting blade tips in place. I have found that it is desirable to set the blade with its cutting tip about one-eighth of an inch lower at the forward point of its arc of travel than at its rear-most point of travel; and this may be accomplished by mounting the body upon the rear wheels in such manner as to obtain such a higher elevation at the rear than at the front of the device. This arrangement serves also the useful purpose of providing suitable space for the rear chopping platform 16 so as to have it low enough for the cutting blades to pass over it and yet at the proper height for the cut grass, etc.

With the container in position upon the mower, the cut grass, leaves, etc. will be caught against the deflector vanes 14 and diverted and forced upwardly and into and about the race-way 15 with a swirling action. The cut material will then be discharged partly directly from the race-way into the container 17 and the remaining portion, which is heavier and less well cut, deposited upon the platform 16 where it will be still further chopped into smaller particles until finally it encounters and passes the hack-saw blades for a still further comminution prior to being deposited in the container 17. With the auxiliary upper cutting blades, the material will be pulverized to an even greater degree in a plane above the race-way and before being deposited upon the chopping platform 16. Then, when the indicator shows the container to be practically filled, it can be readily removed and its contents emptied upon a garden or other soil for use as a mulch and fertilizer. As is well recognized, such disposition of the cut grass, leaves, etc. is much more beneficial than to deposit the same upon the lawn where it would become caked and would cause a choking of the pores of the earth. I have found that my present device may be employed also for the purpose of removing maple seeds and other litter from the pavement or side-walk; under which circumstances there is of course in most instances no grass at the sides of the machine and, in order to prevent the maple seeds and other litter from being discharged laterally out beneath the sides of the body of my device, I have made provision for attachment of a flexible rubber band or an equivalent along each lower side and rear edge portion of the body, as indicated by reference numeral 22'. Any suitable means may be provided for attachment of such bands, or their equivalent so as to be removable.

By omitting the container 17, my machine may perform a valuable service by clearing and chopping spent garden growth in the fall of the year and depositing it in pulverized form upon the ground. If it should be desired to omit the container and to permit the cut material to be deposited upon the ground, as just suggested, the guard or deflector 25 may close the rear end of the body so as to prevent the cut material from being thrown against the legs of the operator. When the container 17 is used, the guard 25 may occupy lowered position to the rear of the container so as to hold the same in place either by its own weight or by means of a suitable form of latch, as for instance an I-bolt 18 in the container rear end and a corresponding slot in the guard 25 to receive the I-bolt for locking engagement therewith, thereby precluding the necessity of a separate latch for the container. Also, the I-bolt upon the rear end of the container 17 could be used as a handle for removing the same from the machine.

By giving the interior portions of the body of my machine a truly circular concave form, there is precluded any danger of the cut grass, leaves, etc. balling up and clogging the interior of the body. Thus, with my present device, there is no hindrance to the movement of the material; whereas in the present-day machines of this general type there is a tendency for the cut grass etc., to accumulate and to ball-up especially when the grass is long and heavy and this interferes seriously with the mowing operation often to the extent of uneven mowing. My present improved machine, by expeditiously and efficiently removing from the mowing area all of the cut material, overcomes this shortcoming of the other rotor type of mowers. Furthermore, the race-way 15 serves to reinforce the body of the present machine.

It is to be understood that this device may be employed effectively as a lawn cleaner as for instance in the cutting and gathering of leaves, etc. as well as grass; and I have found from actual experience that my present mower is capable of successful operation even when the grass and leaves are in wet condition, which is not possible with the present-day machine, so far as I am aware.

Also, I might explain that the condition of the grass and leaves, with respect to moisture, will determine whether it is necessary or advisable to employ any or all of the hack-saw blades and, if any, the extent of the spacing of the same from each other. It is to be understood that the hack-saw blades are individually removable so that any of them may be omitted at any time so as to increase the space between those retained and to prevent clogging. This feature is believed to be a decided improvement over the familiar grill which soon clogs with wet leaves etc.

By arrangement of the cutting edges at an angle, not only will there be effected a more efficient cutting operation but there will be effected also a propulsion of the cut material in a direction about the race-way, in co-operation with the action of the deflector vanes 14.

In order to facilitate removal and renewal of a blade tip, I have provided an opening in the side wall 3 of the body of the machine with a closure 3a which may have any suitable means for holding the same in closed position. This opening may be located at any suitable point so as to permit convenient access to the blade tips of either of the rotatable arms upon which they are mounted.

While I have herein referred to the use of an internal combustion engine, there may be employed any suitable form of motor for the power drive, as for instance an electric motor.

It is to be understood that the present form of disclosure is merely for the purpose of illustration and that there might be devised various modifications thereof without departing from the spirit of my invention as herein set forth and claimed.

It is believed that the practical advantages resulting from my present improved device will be apparent to those who are familiar with the art to which this invention relates, especially in view of the above, and that it is not necessary to here make specific mention of them.

What I claim is:

1. In a mowing machine, the combination of a wheeled vehicular body having closed top, side and front walls and being open at the rear and bottom thereof, the lower part of said side and front walls extending inwardly to form a race-way thereabove with open rear ends, an angularly disposed cutting means occupying a substantially horizontal plane below and adjacent to said race-way and rotatably mounted about a vertical axis and having its shaft of rotation extending through said body top, motive means mounted upon said body top and having operative drive connection with said shaft, and said cutting means having an upwardly, inwardly turned and outwardly-opening inclined fin located rearwardly in the path of rotation thereof so as to propel the cut grass etc. upwardly into and circumferentially about said race-way for discharge therefrom at the rear end thereof.

2. The same structure as recited in claim 1 hereof and with the addition of a container removably mounted upon said body at the rear of said race-way so as to receive the cut grass etc. therefrom.

3. The same structure as recited in claim 1 hereof and with the addition of a chopping platform upon said body at the rear end of said race-way and occupying a level between those of said race-way and cutting means and overlapping the same.

4. The same structure as recited in claim 1 hereof and in which said cutting means has an arm with a readily removable blade upon the end thereof, and in which one of the walls of said body has an opening in substantially the plane of said blade and a readily removable closure therefor so as to permit access to said blade for removal and renewal thereof.

5. The same structure as recited in claim 1 hereof and in which the wheels of said vehicular body include a wheel at each side of the front thereof out of the path of the cutting means, and in which each of said front wheels is mounted upon the bracket hinged to said body for upward swinging of the same so as to permit closer approach of the cutting means to the area to be covered by the mowing machine.

6. The same structure as recited in claim 1 hereof and with the addition of vertically disposed parallel comminuting blades mounted at the rear open end of said body and arranged at an angle so as to have their cutting edges in the path of the cut grass etc. as it leaves said race-way.

7. The same structure as recited in claim 1 hereof and with the addition of vertically disposed parallel comminuting blades mounted at the rear open end of said body and arranged at an angle so as to have their cutting edges in the path of the cut grass etc. as it leaves said race-way, and said comminuting blades being so spaced from each other as to constitute a trap for the cut grass etc.

8. The same structure as recited in claim 1 hereof and with the addition of a container removably mounted upon said body at the rear of said race-way so as to receive the cut grass etc., and an arm pivoted about a horizontal axis upon the rear of said body top and adapted to extend into the path of the cut grass etc. as it is deposited in said container and having an upwardly extending indicator adapted to be moved upwardly by the accumulated cut grass etc. when it has filled said container to a predetermined point.

9. The same structure as recited in claim 1 hereof and in which said cutting means comprises a diametrically disposed arm and a cutter blade at each end thereof, said cutter blade being disposed at an angle of approximately forty-five degrees to said arm and extending rearwardly and outwardly with respect thereto.

10. The same structure as recited in claim 1 hereof and in which said race-way is of inwardly and upwardly curved form.

11. The same structure as recited in claim 1 hereof and in which each side of said body has means provided at the bottom marginal portions thereof for removable attachment of deflector means for preventing discharge of litter beneath the sides thereof.

12. The same structure as recited in claim 1 hereof and in which the inner wall portions of said body are of smoothly curved concave form.

13. The same structure as recited in claim 1 and with the addition of a container removably mounted upon said body at the rear of said race-way so as to receive the cut grass, etc., and with the addition of vertically disposed parallel comminuting blades removably mounted at the front end of said container and arranged at an angle so as to have their cutting edges in the path of the cut grass, etc. as it leaves said raceway.

14. The same structure as recited in claim 1 hereof and with the addition of a removable container adapted for positioning within the open rear end of said body, and a closure hingedly mounted at the upper edge of the rear open end of said body, and means for securing said closure in closed position with or without said container within said body.

15. The same structure as recited in claim 1 hereof and with the addition of an auxiliary blade means rotatable about the axis of said first-named cutting means and in a plane above that of said race-way.

References Cited in the file of this patent

UNITED STATES PATENTS

| | | |
|---|---|---|
| 2,447,442 | Cramer, Jr., et al. | July 26, 1949 |
| 2,559,920 | Hainke | July 10, 1951 |
| 2,641,100 | Sylvester | June 9, 1953 |
| 2,659,191 | Miller et al. | Nov. 17, 1953 |
| 2,663,984 | Clark | Dec. 29, 1953 |
| 2,669,084 | Warren | Feb. 16, 1954 |
| 2,697,322 | Watrous | Dec. 21, 1954 |